United States Patent
Maziers

(10) Patent No.: US 8,420,194 B2
(45) Date of Patent: Apr. 16, 2013

(54) ROTOMOULDED ARTICLES PREPARED WITH POLYETHYLENE

(75) Inventor: Eric Maziers, Seneffe (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 13/342,430

(22) Filed: Jan. 3, 2012

(65) Prior Publication Data

US 2012/0128908 A1 May 24, 2012

Related U.S. Application Data

(63) Continuation of application No. 10/512,388, filed as application No. PCT/EP03/04698 on Apr. 23, 2003, now abandoned.

(30) Foreign Application Priority Data

| Apr. 26, 2002 | (EP) | 02076658 |
| Oct. 15, 2002 | (EP) | 02079264 |
| Dec. 12, 2002 | (EP) | 02027878 |

(51) Int. Cl.
  *B32B 1/08* (2006.01)
  *B32B 27/00* (2006.01)

(52) U.S. Cl.
  USPC ......... 428/36.5; 428/35.7; 526/160; 526/348; 526/943

(58) Field of Classification Search ................. 428/35.7, 428/36.5; 526/160, 348, 943
  See application file for complete search history.

(56) References Cited

U.S. PATENT DOCUMENTS

| 4,093,414 A | * | 6/1978 | Swiatovy, Jr. | 425/113 |
| 2004/0121098 A1 | * | 6/2004 | Maziers | 428/35.7 |

FOREIGN PATENT DOCUMENTS

JP  11129362 A  5/1999

* cited by examiner

*Primary Examiner* — Caixia Lu

(57) ABSTRACT

The present invention is concerned with rotomoulded articles having very low warpage and shrinkage and consisting essentially of polyethylene prepared with a catalyst system based on a bis-indenyl or on a bis(n-butyl-cyclopentadienyl)metallocene component.

9 Claims, 10 Drawing Sheets

Resin R3

Resin R9

Resin R9

Resin R1

Resin R10

Resin R3

ROTOMOULDED ARTICLES PREPARED WITH POLYETHYLENE

This application is a continuation of U.S. application Ser. No. 10/512,388, filed on Jul. 18, 2005, now abandoned, which is a national stage entry of Application No. PCT/EP03/04698, filed on Apr. 23, 2003, which claims priority to European Application No. 02027878.4, filed on Dec. 12, 2002, European Application No. 02079264.4, filed on Oct. 15, 2002, and European Application No. 02076658.0, filed on Apr. 26, 2002.

This invention is concerned with rotomoulded articles having reduced shrinkage and warpage and prepared from polyethylene polymerised with a tetrahydro-indenyl catalyst.

Polyethylene represents more than 80° A) of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate or PVC. Linear low density polyethylene is preferably used as disclosed for example in "Some new results on rotational molding of metallocene polyethyles" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

There is thus a need for rotomoulded articles that do not suffer from these drawbacks.

It is an aim of the present invention to prepare rotomoulded articles with low shrinkage.

It is also an aim of the present invention to produce rotomoulded articles with very little warpage.

It is another aim of the present invention to prepare rotomoulded articles having impact strength and ease of processing.

It is a further aim of the present invention to prepare rotomoulded articles with a very short cycle time.

It is yet another aim of the present invention to prepare rotomoulded articles having a very fine microstructure.

It is yet a further aim of the present invention to prepare rotomoulded articles having an excellent gloss.

Accordingly, the present invention discloses articles produced by rotomoulding and consisting essentially of polyethylene (PE) polymerized with a metallocene catalyst system based on a bis-indenyl or on a bis-cyclopentadienyl metallocene catalyst component.

The high density polyethylene used in the present invention has a density ranking from 0.915 to 0.950 g/cm$^3$, preferably from 0.925 to 0.945 g/cm$^3$ and a melt flow index of from 0.5 to 30 g/10 min, preferably from 2.0 to 20 g/10 min.

In this specification, the density of the polyethylene is measured at 23° C. using the procedures of standard test ASTM D 1505.

The melt index MI2 is measured using the procedures of standard test ASTM D 1238 at 190° C. and under a load of 2.16 kg.

The metallocene used to prepare the high density polyethylene can be a bis-indenyl represented by the general formula:

$$R''(Ind)_2MQ_2 \qquad (I)$$

or a bis-cyclopentadienyll represented by the formula

$$(Cp)_2MQ_2 \qquad (II)$$

wherein (Ind) is an indenyl or an hydrogenated indenyl, substituted or unsubstituted, Cp is a cyclopentadienyl ring substituted or unsubstituted, R" is a structural bridge between the two indenyls to impart stereorigidity that comprises a C$_1$-C$_4$ alkylene radical, a dialkyl germanium or silicon or siloxane, or a alkyl phosphine or amine radical, which bridge is substituted or unsubstituted; Q is a hydrocarbyl radical having from 1 to 20 carbon atoms or a halogen, and M is a group IVb transition metal or Vanadium.

In formula (I), each indenyl or hydrogenated indenyl compound may be substituted in the same way or differently from one another at one or more positions in the cyclopentadienyl ring, the cyclohexenyl ring and the bridge.

In formula (I), each substituent on the indenyl may be independently chosen from those of formula XR$_v$ in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must be so bulky as to affect coordination of the olefin monomer to the metal M. Substituents on the cyclopentadienyl ring preferably have R as hydrogen or CH$_3$. More preferably, at least one and most preferably both cyclopentadienyl rings are unsubstituted.

In a particularly preferred embodiment, both indenyls are unsubstituted.

In formula (II), each cyclopentadienyl ring may be substituted in the same way or differently from one another at one or more positions in the cyclopentadienyl ring.

In formula (II), each substituent on the cyclopentadienyl may be independently chosen from those of formula XR*$_v$ in which X is chosen from group IVA, oxygen and nitrogen and each R* is the same or different and chosen from hydrogen or hydrocarbyl of from 1 to 20 carbon atoms and v+1 is the valence of X. X is preferably C and the most preferred substituent is n-butyl.

R" is preferably a C1-C4 alkylene radical (as used herein to describe a difunctional radical, also called alkylidene), most preferably an ethylene bridge (as used herein to describe a difunctional radical, also called ethylidene), which is substituted or unsubstituted.

The metal M is preferably zirconium, hafnium, or titanium, most preferably zirconium.

Each Q is the same or different and may be a hydrocarbyl or hydrocarboxy radical having 1 to 20 carbon atoms or a halogen. Suitable hydrocarbyls include aryl, alkyl, alkenyl, alkylaryl or arylalkyl. Each Q is preferably halogen.

Among the preferred metallocenes used in the present invention, one can cite bis tetrahydro-indenyl compounds and bis indenyl compounds as disclosed for example in WO 96/35729 or bis(cyclopentadienyl) compounds. The most preferred metallocene catalysts are ethylene bis(4,5,6,7-tetrahydro-1-indenyl)zirconium dichloride and bis(n-butyl-cyclopentadienyl)zirconium dichloride.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

The addition on the support, of an agent that reacts with the support and has an ionising action, creates an active site.

Preferably, alumoxane is used to ionise the catalyst during the polymerization procedure, and any alumoxane known in the art is suitable.

The preferred alumoxanes comprise oligomeric linear and/or cyclic alkyl alumoxanes represented by the formula:

for oligomeric, linear alumoxanes
And

for oligomeric, cyclic alumoxanes,
wherein n is 1-40, preferably 10-20, m is 3-40, preferably 3-20 and R is a $C_1$-$C_8$ alkyl group and preferably methyl.

Methylalumoxane is preferably used.

One or more aluminiumalkyl(s) can be used as cocatalyst in the reactor. An aluminiumalkyl represented by the formula $AlR_3$ can be used wherein each R is the same or different and is selected from halides or from alkoxy or alkyl groups having from 1 to 12 carbon atoms. Especially suitable aluminiumalkyl is trialkylaluminium, the most preferred being triisobutylaluminium (TIBAL).

Further, the catalyst may be prepolymerised prior to introducing it in the reaction zone and/or prior to the stabilization of the reaction conditions in the reactor.

The polymerisation of the metallocene-produced high density polyethylene can be carried out in gas, solution or slurry phase. Slurry polymerisation is preferably used to prepare the high density polyethylene. The polymerisation temperature ranges from 20 to 125° C., preferably from 60 to 95° C. and the pressure ranges from 0.1 to 5.6 Mpa, preferably from 2 to 4 Mpa, for a time ranging from 10 minutes to 4 hours, preferably from 1 and 2.5 hours.

A continuous single loop reactor is preferably used for conducting the polymerisation under quasi steady state conditions. A double loop reactor can also be used to produce either monomodal or bimodal resins, such as for examples a resin consisting of a first fraction produced in the first reactor under first polymerisation conditions and a second fraction produced in the second reactor under second polymerisation conditions, said two fractions having the same molecular weight and different densities.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The density of the polyethylene is regulated by the amount of comonomer injected into the reactor, examples of comonomer which can be used include 1-olefins, typically C3 to C20 olefins among which propylene, butene, hexene, octene, 4-methyl-pentene are preferred, the most preferred being hexene.

The rotomoulding machine can be any one of the machines generally used in the field such as for example the CACCIA 1400R rotational moulding machine.

The rotomoulded polyethylene articles according to the present invention are characterised by very low warpage and shrinkage.

The polyethylene structure is mainly influenced by the catalytic system used for polymerisation and said structure is responsible for the properties of the final articles. It has been observed that a n-butyl catalyst produces a linear polyethylene resin with a narrow molecular weight distribution of about 2.5, that a Ziegler-Natta catalyst produces a linear polyethylene resin with a broader molecular weight distribution of the order of 5 and that a tetrahydro-indenyl catalyst produces a polyethylene with a large amount of long chain branches and a narrow molecular weight distribution of the order of 2.5.

The molecular weight distribution (MWD) is completely defined by the polydispersity index D that is the ratio Mw/Mn of the weight average molecular weight (Mw) to the number average molecular weight (Mn).

The Dow Rheological Index (DRI) gives a measure of the amount of long chain branches. The lower the DRI value, the lower the amount of long chain branches. In the present invention the DRI is determined by fitting the Rheological Dynamic Analysis (RDA) curve of the HDPE by the Cross rheological model described here-below.

The dynamic rheology is measured using the method of the RDA. It is a measure of the resistance to flow of material placed between two parallel plates rotating with respect to each other with an oscillatory motion.

The apparatus comprises a motor that transmits a sinusoidal deformation to the sample. The sample then transmits the resulting constraint, said resulting constraint being also sinusoidal. The material to be studied can be a solid attached between two anchoring points or it can be melted between the two plates. The dynamic rheometer allows the simultaneous measurement of both the elastic modulus and the viscous modulus of the material. Indeed, the resulting sinusoidal constraint is displaced by a phase angle δ with respect to the imposed deformation and it is mathematically possible to decompose the resulting sinusoid into:

a first sinusoid in phase with the initial deformation that represents the elastic component of the material. Said component conserves energy.

a second sinusoid displaced by a phase angle of π/2 with respect to the initial deformation that represents the viscous component. Said component dissipates energy into heat.

The initial deformation is represented by the formula $\gamma = \gamma_0 \sin(\omega t)$ wherein ω is the frequency.

The resulting constraint is thus of the form $\tau = \tau_0 \sin(\omega t + \delta)$ The complex modulus is given by the formula $G = \tau/\gamma$ The complex modulus can be decomposed into the elastic modulus G' and the viscous modulus G" defined respectively as $$G' = G \cos(\delta)$$

and $$G'' = G \sin(\delta)$$

The complex viscosity is defined as G/ω.

At constant temperature and constant deformation amplitude, G' and G" can be measured for different values of ω. The measurements were carried out under the following operating conditions:
- a constant operating temperature of 190° C.,
- parallel plates separated by 1.5 mm,
- maximum deformation maintained at 10%.

The elastic component G' and the viscous component G" can be graphed as a function of frequency ω. The point of intersection between the elastic and viscous curves, called the cross-over point (COP), is characterised by a frequency $\omega_c$ and a viscosity component $G_c$. The cross-over point is characteristic of each polymer and is a function of the molecular weight and of the molecular distribution.

To characterize the rheological behavior of substantially linear ethylene polymers, S. Lai and G. W. Knight have introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (Antec '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = (365000 \cdot \gamma / \eta_0 - 1)/10$$

wherein γ is the characteristic relaxation time of the material and $\eta_0$ is the zero shear viscosity of the material. The DRI is calculated by least squares fit of the rheological curve (complex viscosity versus frequency) as described in U.S. Pat. No. 6,114,486 with the following generalized Cross equation, i.e.

$$\eta = \eta_0/(1+(\gamma\lambda)^n)$$

wherein n is the power law index of the material, η and γ are the measured viscosity and shear rate data respectively. The dynamic rheological analysis was performed at 190° C. and the strain amplitude was 10%. Results are reported according to ASTM D 4440. A low value of the Dow rheological index is indicative of low or inexistant Long Chain Branching (LCB). At equivalent molecular weight distribution, the content of LCB increases with increasing DRI. A value of DRI above one indicates a high level of LCB. It is also known that a high level of LCB is associated with a large elastic component as indicated by dynamic rheology.

The resins according to the present invention further have excellent flexural yield strength and flexural properties. They also have good impact strength both at room temperature and at low temperature Additionally, the production cycling time of the polyethylene resins produced with a bis-indenyl catalyst and preferably with a tetrahydro-indenyl catalyst is in line with that of other polyethylene resins.

It has further been observed that the rotomoulded articles prepared with the polyethylene according to the present invention offer a better resistance to degradation from nitric acid.

In yet another embodiment of the present invention, the rheological properties of the polyethylene produced with a tetrahydro-indenyl catalyst are used to prepare micro-pellets having an average size of from 300 to 800 microns in a one-step procedure: it is a result the fast decrease of the viscosity with increasing shear.

In yet a further embodiment of the present invention, rotomoulded articles having an inner foamed polyethylene layer and an outer normal polyethylene layer can be prepared. The large elastic viscosity component G' of the polyethylene prepared with a tetrahydro-indenyl catalyst is responsible for the better dispersion of bubbles into the foamed material.

In another aspect of the present invention, the articles prepared with a catalyst component based either on tetrahydro indenyl or on bis(n-butyl-cyclopentadienyl) have a very fine microstructure, thereby improving their mechanical properties such as impact strength and their optical properties, such as gloss and their impermeability to solvents.

The polyethylene resins of the present invention can also be cross-linked by any cross-linking agent known in the field prior to being rotomoulded.

The polyethylene polymerized with a bis-indenyl or a bis) cyclopentadienyl metallocene catalyst according to the present invention can be used to produce rotomoulded articles in a variety of applications such as for example tanks, containers, toys, boats, furniture, medical applications, buried tanks, septic tanks, fuel tanks.

LIST OF FIGURES

EXAMPLES

Several high density polyethylene resins have been tested and compared in rotomoulding applications.

Resin R1 is a polyethylene resin prepared with a metallocene catalyst and sold by Borealis under the name Borocene® RM8343.

Resins R2, R5 and R6 have been prepared with ethylene bis(4,5,6,7-tetrahydro-1-indenyl)zirconium dichloride.

Resin R3 is a commercial Ziegler-Natta resin sold by BP under the name Rigidex® 3560

Resins R7 and R8 were prepared with di(n-butyl-cyclopentadieny)zirconium dichloride.

Resin R9 was prepared with ethylene bis(4,5,6,7-tetrahydro-1-indenyl)zirconium dichloride.

Resin R10 was prepared with di(n-butyl-cyclopentadieny)zirconium dichloride.

Resins R11 and R12 were prepared with ethylene bis(4,5,6,7-tetrahydro-1-indenyl) zirconium dichloride and had a very low melt index.

The resins' properties are summarised in Table I.

TABLE I

| Resin | $\eta_0$ (Pa·s) | catalyst | DRI @ 190° C. | MI2 (g/10 min) | Density (g/cm³) | MWD |
|---|---|---|---|---|---|---|
| R1 | 1045 | metallocene | 0.04 | 6 | 0.934 | 2.1 |
| R2 | 3394.39 | THI | 3.88 | 4.2 | 0.939 | 2.9 |
| R3 | 1357.83 | ZN | 0.37 | 6.38 | 0.936 | 4.0 |
| R5 | 1518.88 | THI | 0.99 | 7.04 | 0.936 | 2.5 |
| R6 | 1227.78 | THI | 0.63 | 7.9 | 0.937 | 2.3 |
| R7 | 1106.25 | n-butyl | 0.04 | 6.24 | 0.936 | 2.2 |
| R8 | 238.04 | n-butyl | 0.04 | 5.3 | 0.936 | 2.1 |
| R9 | 950.00 | THI | 1 | 8 | 0.935 | 2.2 |
| R10 | 1000.00 | n-butyl | 0 | 6 | 0.935 | 2.2 |
| R11 | >10000 | THI | 10.2 | 0.9 | 0.934 | 2.3 |
| R12 | >10000 | THI | 11.3 | 0.7 | 0.947 | 2.4 |

Wherein $\eta_0$ is the zero-shear viscosity.

As can be seen from Table 1, the main difference between resins R1, R7, R8 and R10 on the one hand and resins R2, R5, R6 and R9 on the other hand lies in the values for the Dow Rheological index (DRI), said values being extremely low for the resins prepared with the n-butyl catalyst. It must be noted that for resin R3 prepared with a Ziegler-Natta catalyst the DRI value is influenced by the molecular weight distribution that is broader than that of a resin prepared with a metallocene catalyst. It must also be noted that resins R11 and R12 have melt flow indices of 0.9 and 0.7 g/10 min, well below the minimum value of about 2 g/10 min generally recommended in the field of rotomoulding.

Figure 1:
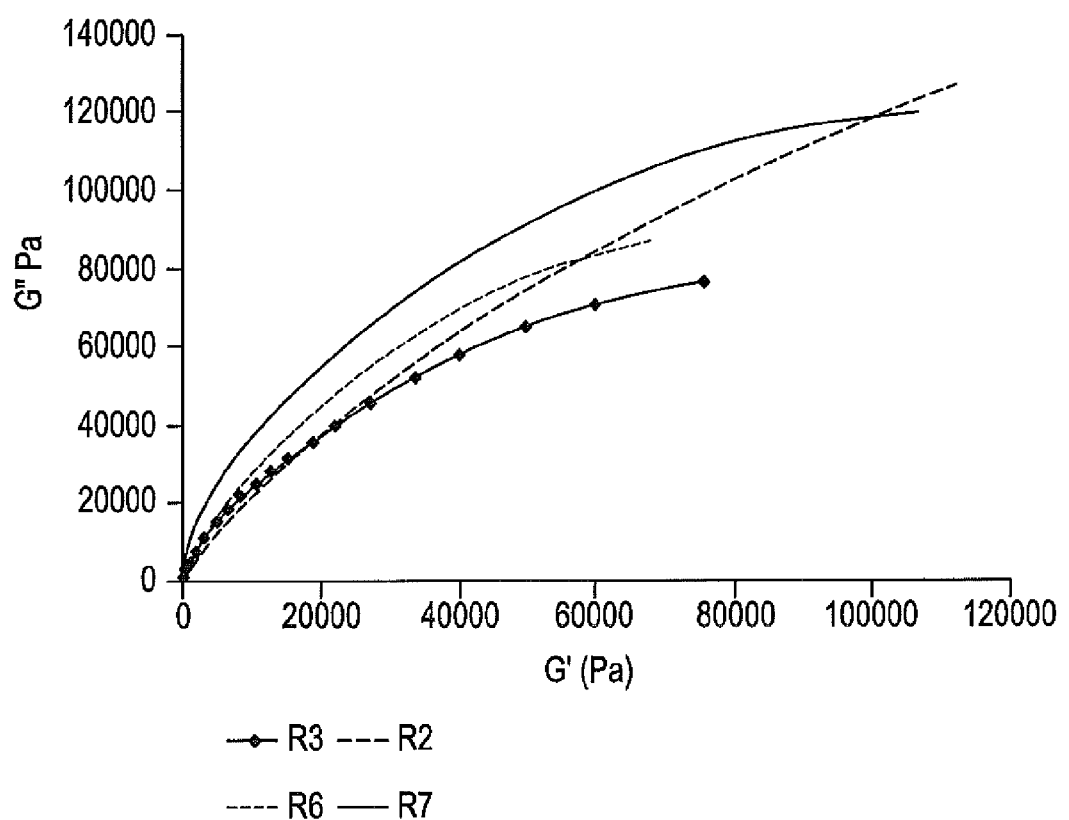
FIG. 1 represents the viscous modulus G" expressed in Pa as a function of the elastic modulus G' expressed in Pa.

The elastic component of the various resins is displayed in FIG. 1 that represents the viscous modulus G" expressed in Pa graphed as a function of the elastic modulus G' expressed in Pa. It can be deduced from that graph that resins R2 and R3 prepared respectively with a tetrahydro-indenyl catalyst and with a Ziegler-Natta catalyst have the largest elastic component, resin R6, prepared with a tetrahydro-indenyl catalyst has an intermediate elastic component and resin R7 prepared with the n-butyl catalyst has the lowest elastic component. R2 presents a higher elastic component G' than R6 because it has a higher molecular weight than R6.

Figure 2:
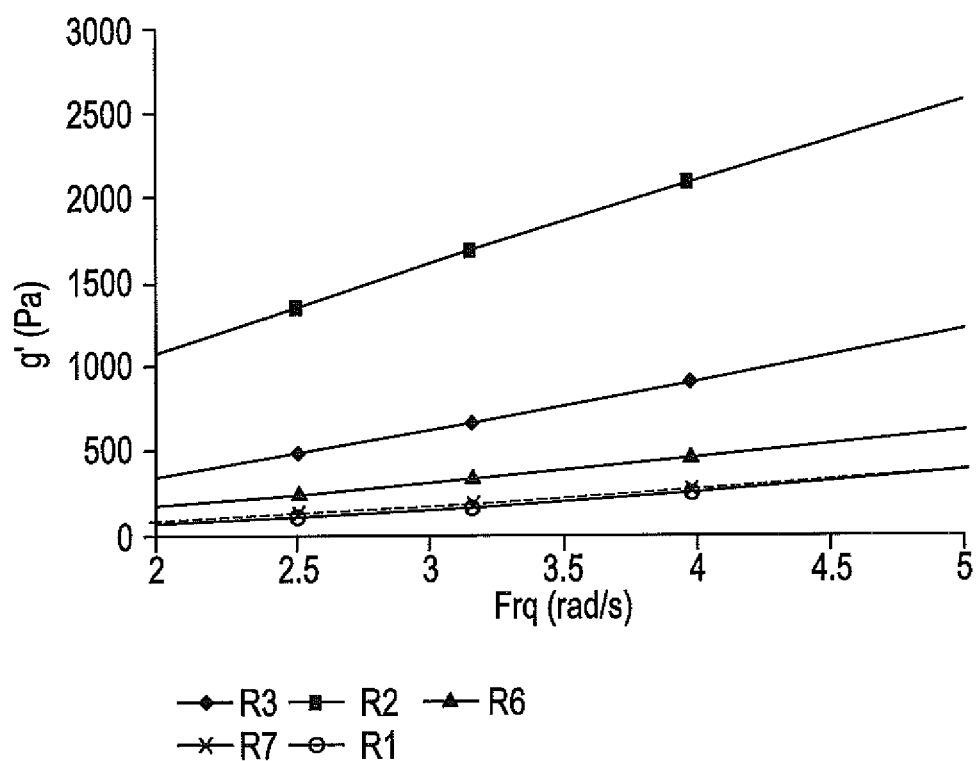
FIG. 2 represents the elastic component G' expressed in Pa as a function of shear rate expressed in s−1.

FIG. 2 represents the elastic component G' expressed in Pa as a function of shear rate expressed in s−1. It is observed on that graph that resin R7 prepared with a n-butyl metallocene catalyst has the lowest elastic component which is favorable to sintering. These rotomoulded articles prepared from these resins however suffer from high shrinkage and warpage. Resin R3, prepared with a Ziegler-Natta catalyst has a higher elastic component than R7, thus less favorable for sintering. Resin R6 prepared according to the present invention has an intermediate position between resins R7 and R3 and offers the advantage of very small shrinkage and warpage.

A first set of rotational moulding trials were carried out on the polyethylene powders, R2, R3, R6 and R7 micronised on the WEDCO® machine. Each grade polymer was exposed to three peak internal air temperatures (PIAT) that were respectively of 180, 190 and 210° C. The PIAT is defined as the maximum temperature that the mould reached within the oven before it was removed to the cooling bay of the rotational moulding machine. In all cases, the parts were moulded using an oven set temperature of 300° C. The ROTOLOG® temperature measuring system was used to record the temperature profiles of the internal air, material, and mould as well as that of the oven. The system consists of an insulated radio transmitter, which is attached to the mould and travels with it in the oven and in the cooler bay.

The transmitter sends a signal to a receiver, which in turn is connected to a computer that uses the ROTOLOG® software to graph real-time temperature/time data.

All test mouldings were carried out on the CACCIA 1400R rotational moulding machine having the following specifications:

Shuttle-style machine

Offset arm

LPG burner arm

Burner capacity of 7700 Kcal/hr

Air fan cooling

Maximum plate diameter of 950 mm.

The mould used to produce the test mouldings was an aluminium cube mould of base 300 mm×300 mm with a central vent port and with a draft angle of 3° included to facilitate demoulding. The shot weight was set at 1.8 kg to produce 3 mm thick mouldings. The mould was removed from the oven at peak internal temperatures of 180° C., 190° C. and 210° C. The cooling medium for all the materials was forced air and the moulding conditions for the trials were as follows:

oven temperature: 300° C.

rotation ratio: ~4:1 cooling medium: forced air preheated arm and mould rotolog unit n° 5 and rotolog software version 2.7

The total cycle times for the mouldings are shown in Table II. All cycle times are taken from the same start point of 50° C. and a demoulding temperature of 79° C. to allow for easier comparison.

TABLE II

| | Overall cycle time in minutes | | |
|---|---|---|---|
| Material | PIAT of 180° C. | PIAT of 190° C. | PIAT of 210° C. |
| R2 | 33.05 | 33.47 | 36.27 |
| R3 | 29.5 | 30.52 | 37.3 |
| R6 | 30.93 | 32.99 | 38.3 |
| R7 | 39.2 | 39.4 | 43.1 |

It can be seen from Table II that for all samples tested the overall cycle time increases with increasing PIAT.

Shrinkage and warpage were measured on all samples as follows.

Mould shrinkage factors are measured by recording how much a moulded article dimension reduces after the moulding has cooled. The reduced dimension is related to a reference dimension taken from the actual mould. In the case of the box mould used in the present invention, the mould had a grid machined into the bottom of its cavity. The distance selected as the reference value was the hypotenuse distance of the grid at the bottom of the mould: it was measured to be 169.9 mm. The distance between the same two reference points was recorded on the cooled moulding and the percentage of shrinkage was then determined. The measuring apparatus consisted of a milling machine bed upon which the moulded article was placed. An electronic microscope was fixed onto movable axes positioned above the milling bed. Any movements of the axes, and subsequently of the microscope, were measured on an electronic meter so that the X and Y coordinates of movement could be obtained. Once the moulded article was positioned properly on the milling bed, the X and Y distances of the grid reproduced on the moulding could be measured and the diagonal distance between the selected grid points could be calculated, and compared to the reference value of 169.9 mm, thereby allowing to calculate the percentage of shrinkage. The results are displayed in Table III

TABLE III

| | Shrinkage in % | | |
|---|---|---|---|
| Material | PIAT of 180° C. | PIAT of 190° C. | PIAT of 210° C. |
| R2 | 2.55 | 2.39 | 2.65 |
| R3 | 2.43 | 2.67 | 2.83 |
| R6 | 2.24 | 2.16 | 2.29 |
| R7 | 3.28 | 3.12 | 3.07 |

The best results have been obtained with resin R6.

The amount of warpage on a moulded article was measured by using a dial gauge in conjunction with the apparatus described here-above for measuring the shrinkage. The dial gauge pointer was placed above the centre of the grid and the milling machine bed was raised vertically so that a datum value could be set on the gauge. The milling bed was then moved so that the dial gauge sat on a point of the grid and a reading was made of how much the pointer rose or fell with respect to the datum value. This was repeated for all the points on the grid and the maximum warpage was defined as the largest deviation from the datum. The results for warpage are displayed in Table IV.

TABLE IV

| | Maximum warpage in mm | | |
|---|---|---|---|
| Material | PIAT of 180° C. | PIAT of 190° C. | PIAT of 210° C. |
| R1 | 2.45 | 2.2 | 1.41 |
| R2 | 1.9 | 2.0 | 1.52 |
| R3 | 2.45 | 3.25 | 1.72 |
| R6 | 2.24 | 1.55 | 2.12 |
| R7 | 3.28 | 2.6 | 2.95 |
| R9 | 0.69 | 0.31 | 0.92 |
| R10 | 2.6 | 2.6 | 2.9 |

It can be seen from the results displayed in Tables III and IV that the resin prepared with the n-butyl catalyst exhibited the largest values for both shrinkage and warpage.

Impact measurements were carried out following the method of standard test ASTM 5420 both at room temperature and at a temperature of −40° C. The test results were obtained on an average of at least 5 samples.

Modes of failure during impact testing fall into two categories: brittle and ductile. With brittle failure, a crack initiates and propagates prior to any bulk yielding of the specimen and hence the point of failure lies on the initial rising portion of the load/deformation curve. In the case of ductile failure, considerable yielding takes place and the failure occurs well after the maximum on the load/deformation curve. As the area under the load/deformation curve is a measure of the fracture energy, it follows that brittle failure is associated with very low absorbed energy as compared to ductile failure.

The samples used for impact tests were all taken from the same side of each trial moulding so that the results were made comparable to the moulding conditions. They were cut with a bandsaw into squares of 60 mm×80 mm, the edges were cleaned of burrs and the thickness at the centre of each sample was noted. The machine used was the CEAST Fractovis and depending upon the thickness and the expected strength of the sample under test, the sensitivity and the working range of the load cell were appropriately set up to sense the sample failure.

The impact results were recorded both at room temperature and at −40° C. for resins R2, R3, R6 and R7 and respectively for the peak internal air temperatures of 180, 190 and 210° C. The results are displayed in Table V. They are expressed in J/mm.

TABLE V

| | PIAT of 180° C. | | PIAT of 190° C. | | PIAT of 210° C. | |
|---|---|---|---|---|---|---|
| Resin | T = −40° C. | Room T | T = −40° C. | Room T | T = −40° C. | Room T |
| R2 | 8.84 ductile | 7.71 ductile | 8.52 ductile/ brittle | 6.99 ductile | 8.57 ductile | 7.32 ductilt |
| R3 | 8.83 ductile | 7.08 ductile | 6.58 ductile/ brittle | 5.5 ductile | 10.3 ductile/ brittle | 7.69 ductile |
| R6 | 8.09 brittle | 7.01 ductile | 7.2 brittle | 7.29 ductile | 7.02 brittle | 7.12 ductile |
| R7 | 9.98 brittle | 8.34 ductile | 10.36 ductile | 7.82 ductile | 10.25 ductile | 8.56 ductile |

As can be observed, all the samples exhibited a ductile failure at room temperature. It is also observed that the cold temperature (−40° C.) impact values are higher than the room temperature impact values.

Stacking tests with nitric acid have also been performed on resins R2, R3 and R6. The measurements were carried out following the method of ADR Standard—Appendix A.5. The load applied had a density of 1.4 g/cm$^3$ and the containers were hollow 30 liters items of 1.8 kg. The times to failure were respectively of 35 days for comparative ZN resin R3 and of 150 days for resins R2 and R6 according to the present invention.

Figure 3A:
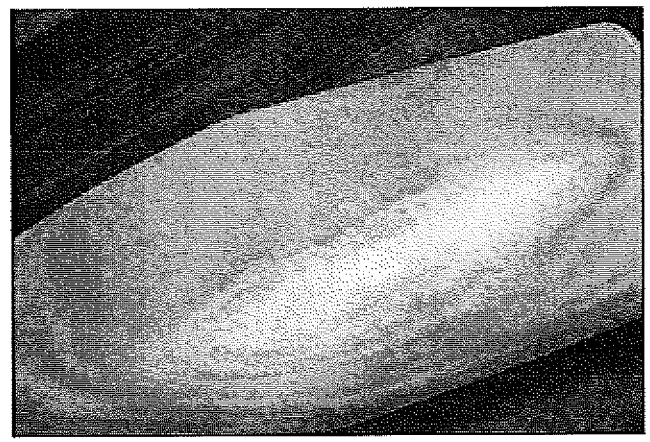
FIG. 3 represents containers produced respectively with resin R3 (FIG. 3a) and with resin R9 (FIG. 3b).
Figure 3B:
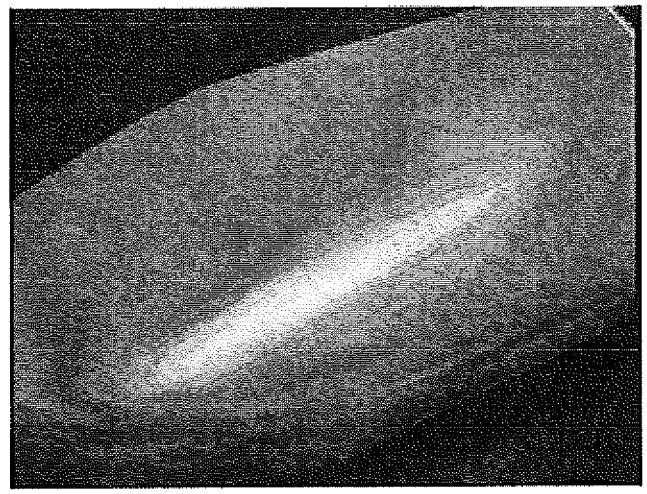
Figure 4A:
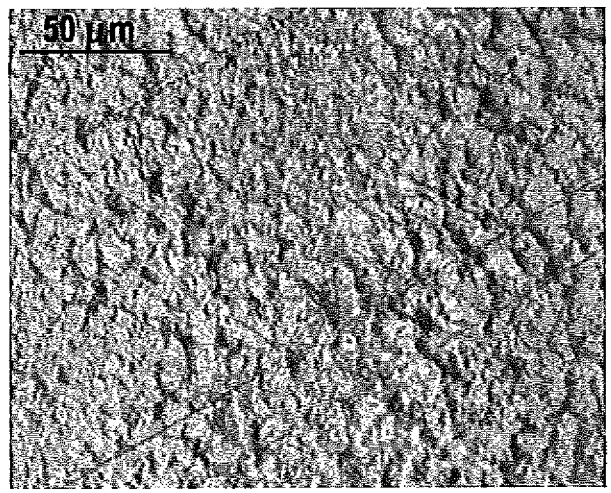
FIG. 4 represents the microstructure of resins R9 (FIG. 4a), R1 (FIG. 4b), R10 (FIG. 4c) and R3 (FIG. 4d).
Figure 4B:
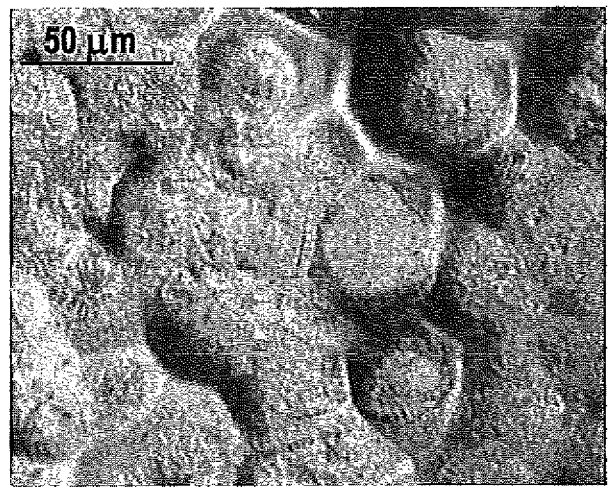
Figure 4C:
Figure 4D:
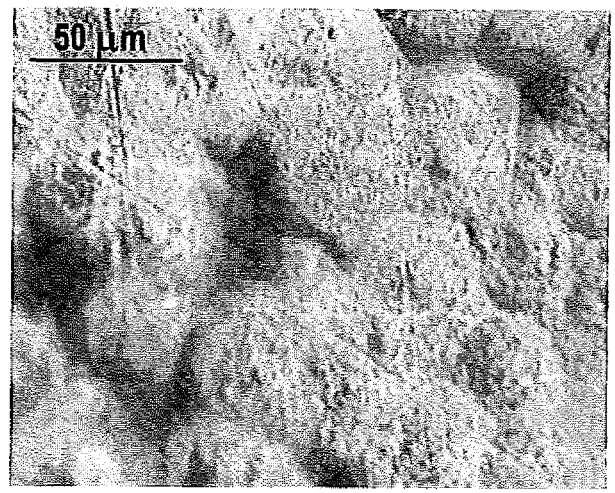

Surface gloss evaluations have been carried out on resins R1, R3, R9 and R10 using a standard finish mould and a mirror polished mould. The PIAT was 190° C. and the gloss was measured using the method of standard test ASTM D 2547-90. The gloss results expressed in % are displayed in Table VI and in FIG. 3.

TABLE VI

| Resin | 45° light incidence | | 20° light incidence | |
| --- | --- | --- | --- | --- |
|  | Standard finish (%) | Mirror polished (%) | Standard finish (%) | Mirror polished (%) |
| R1 | 13 | 35 |  | 45 |
| R3 | 12 | 43 |  | 48 |
| R9 | 14 | 60 |  | 78 |
| R10 | 13 | 47 |  | 60 |

It can be seen that the containers prepared with the resins of the invention have a much better gloss than the reference resins usually used in rotomoulding applications.

Figure 5:
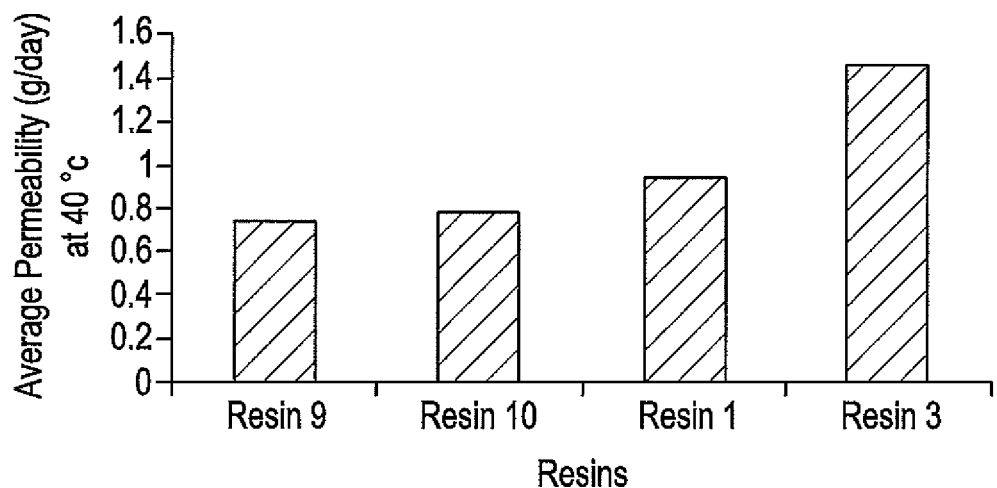
FIG. 5 is a graph representing the average permeability to fuel expressed in g/day at 40° C. for rotomoulded bottles prepared with resins R9, R10, R1 and R3.

The microstructure of resins R9 and R10 according to the invention and of reference resins R1 and R3 was also studied following the method described in Oliveira and Cramez (Oliveira M. J., and Cramez M. C.; J. Macrom. Sci.-Physics, 840, 457, 2001.), wherein the size of the spherulites is caracterised by microscopy. The spherulites of reins R9 and R10 have a much smaller size than those of the reference resins R1 and R3 as can be seen in FIGS. 4*a* to 4*d*. It can be seen that the resins according to the invention have a structure that ressembles that of polymers compounded with nucleating additives. As a consequence, the resins according to the invention have an improved impermeability to solvents as can be seen in FIG. 5. FIG. 5 represents the permeability to fuels expressed in g/day at 40° C. measured on rotomoulded 700 ml bottles having a weight of 150 g and prepared at a PIAT of 190° C. with resins R1, R3, R9 and R10. They also have improved mechanical properties such as for example impact strength and stress crack resistance and improved optical properties, such as gloss.

Figure 6:
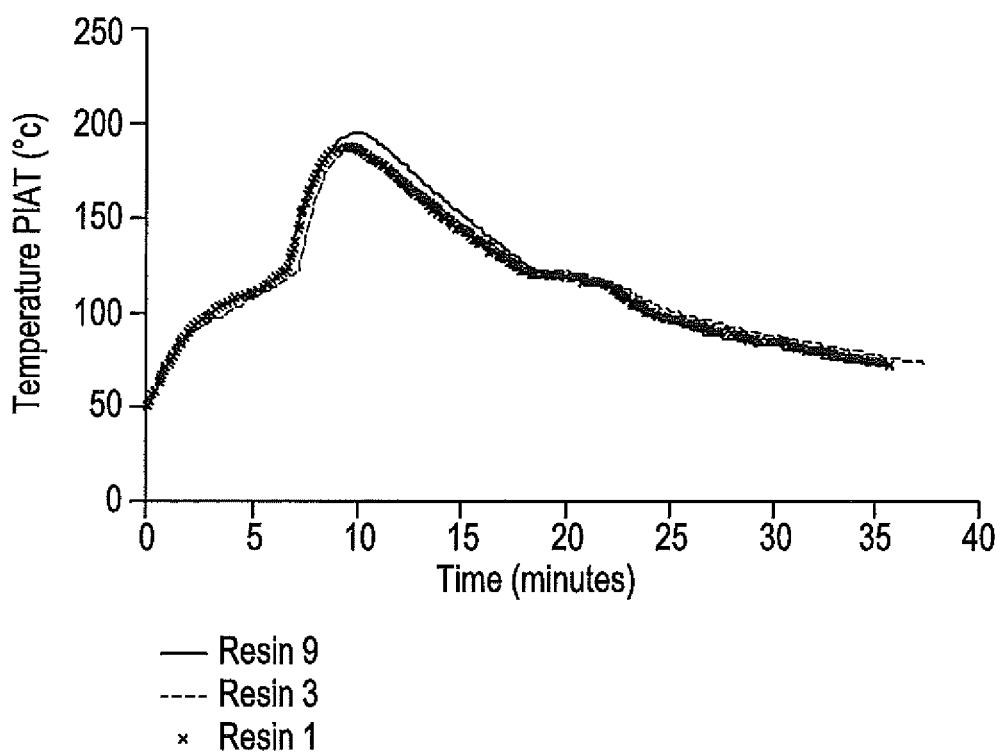
FIG. 6 represents the peak internal air temperature (PIAT) temperature expressed in ° C. for a normal mould as a function of time expressed in seconds.
Figure 7:
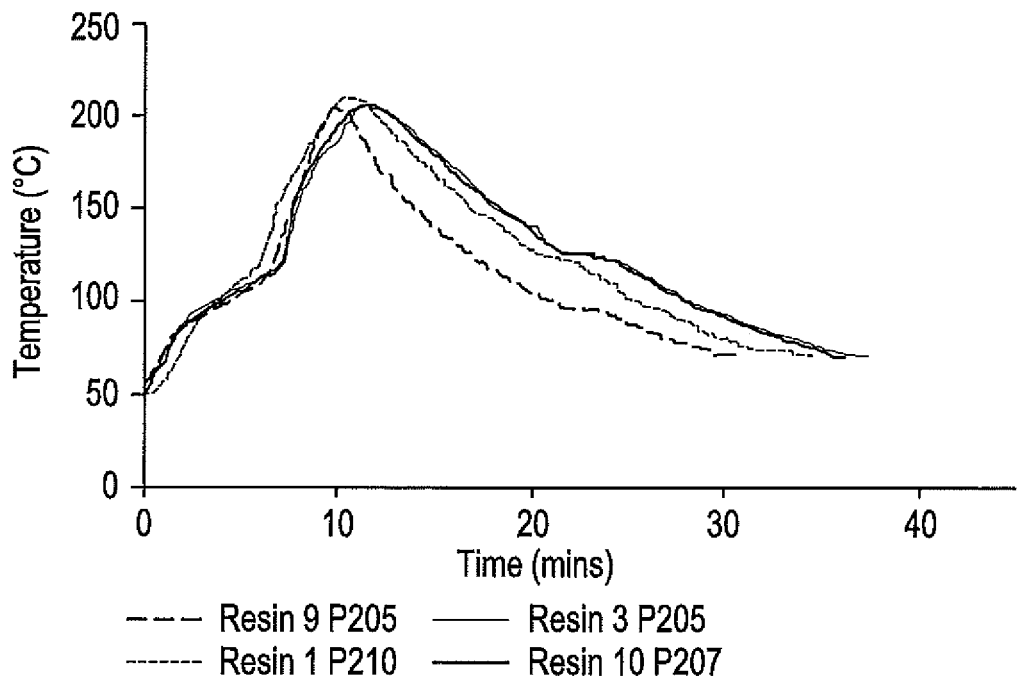
FIG. 7 represents the peak internal air temperature (PIAT) temperature expressed in ° C. for a pressurised mould as a function of time expressed in seconds.

The cycle time was measured for rotomoulded articles prepared with resins R1, R3 and R9 at a PIAT of about 190° C. The results are displayed in FIG. 6 representing for the three resins the PIAT temperature expressed in ° C. as a function of time expressed in seconds. It can be observed that resin R9, although it has a PIAT higher (by about 8° C.) than that of the other resins, crystallises faster than resins R1 and R3. Further tests on the cycle time were carried out using a pressurised mould as described by Crawford (Crawford R. presented at "Advanced seminar in rotational moulding." held in Minneapolis on 23 Sep. 2001.), The results are presented in FIG. 7 and dearly show a dramatic reduction in crystallisation time and cycle time for resin R9.

Figure 8:
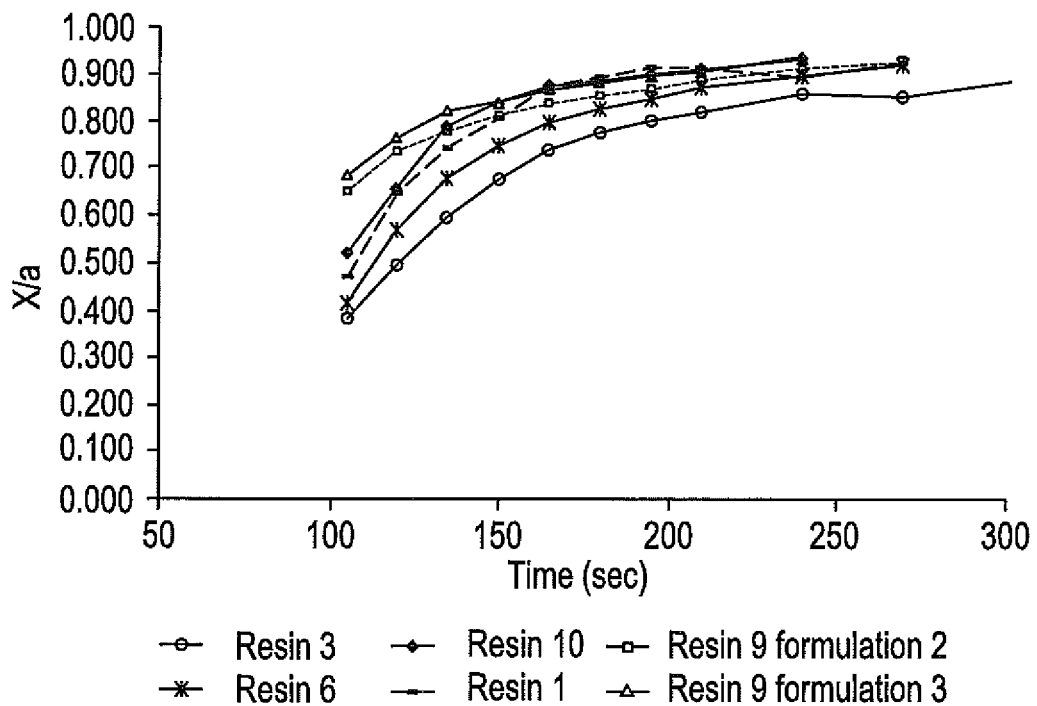
FIG. 8 represents the radius X/a as a function of time expressed in seconds in sintering experiments, wherein X is the sintering neck radius between the two spheres to be sintered and a is the radius of the spheres.

Sintering studies have been carried out following the method described by Bellehumeur et al, (Bellehumeur C. T., Kontopoulou M., Viachopoulos J., in Rheol. Acta, 37, 270, 1998.). The resins have been compounded with the usual additives recommended for by Ciba. For example resin R9 has been additivated with 800 ppm of Irganox® 1010 and 1500 ppm of Irgafos® 168 mixed with zinc stearate to produce resin R9 formulation 2. In another test it has been additivated with 800 ppm of Irganox® 1010 and 1500 ppm of Irgafos® P-EPQ mixed with zinc stearate to produce resin R9 formulation 3. These two formulations have an improved coalescence time as shown in FIG. 8 representing the ratio X/a as a function of time expressed in seconds, and wherein X is the sintering neck radius between the two spheres to be sintered and a is the radius of the spheres. At time zero, X is zero when the two spheres are just touching and as they coalesce X becomes equal to the radius of the final sphere.

Resins R9 and R10 were ground to powder on state of the art grinding equipment: they exhibited outstanding performances in terms of productivity.

Polyethylene resins, prepared with a bis-indenyl metallocene catalyst system, and having densities in the range of from 0.910 to 0.940 g/cm$^3$ and a MI2 in the range of from 0.1 to 2 g/10 min are not suitable, as such, for rotomoulding applications. They can however be used as impact modifiers in blends for rotational moulding applications. Up to 50 wt % of resins having densities in the range of from 0.910 to 0.940 g/cm$^3$ and MI2 in the range of from 0.1 to 2 g/10 min can be blended with polyethylene or with polypropylene for use in rotomoulding, blow moulding, injection blow moulding or injection moulding applications.

Resin R9 was also tested under various grinding conditions, using either different grinding machines, or using the same grinder to produce powders of different granulometry. The standard pellets were ground into powders having an average size of about 300 microns and the particle size distribution analysis was carried out Using the method of standard test ASTM D 1921 and further described in McDaid and Crawford (J. McDaid and R. J. Crawford, in "The grinding of polyethylene for use in rotational moulding." In Rotation, Spring 1997, 27.). The samples were produced on the following machines:

sample 1: reduction Engeneering machine
sample 2: Palman machine
samples 3 and 4: Wedco machine with different granulometries
samples 5 and 6: Palman HI machine with different granulometries.

Figure 9:
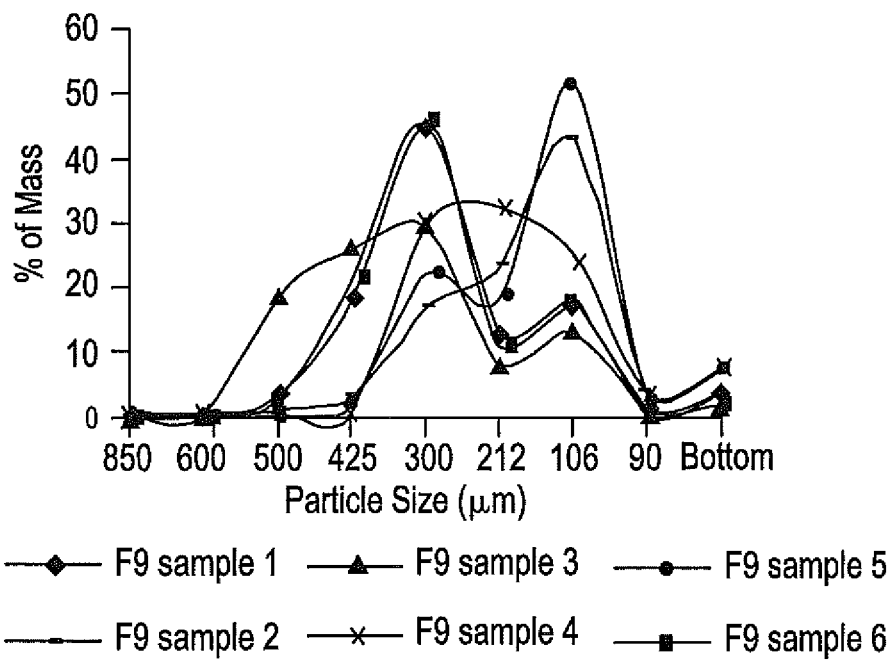
FIG. 9 represents the mass fraction of the powder expressed in percent as a function of particle size expressed in microns.

All grindings were carried out at the highest throughput for each machine with productions in the range of 800 to 1200 kg/hr. Resin R9 was easy to grind and grinding reached a steady state after about 30 minutes instead of the two to three hours necessary for conventional resins. No static electricity problems were observed. The granulometry analysis for these 6 samples is displayed in FIG. 9 representing the mass fraction of the powder expressed in percent as a function of particle size expressed in microns.

Figure 10:
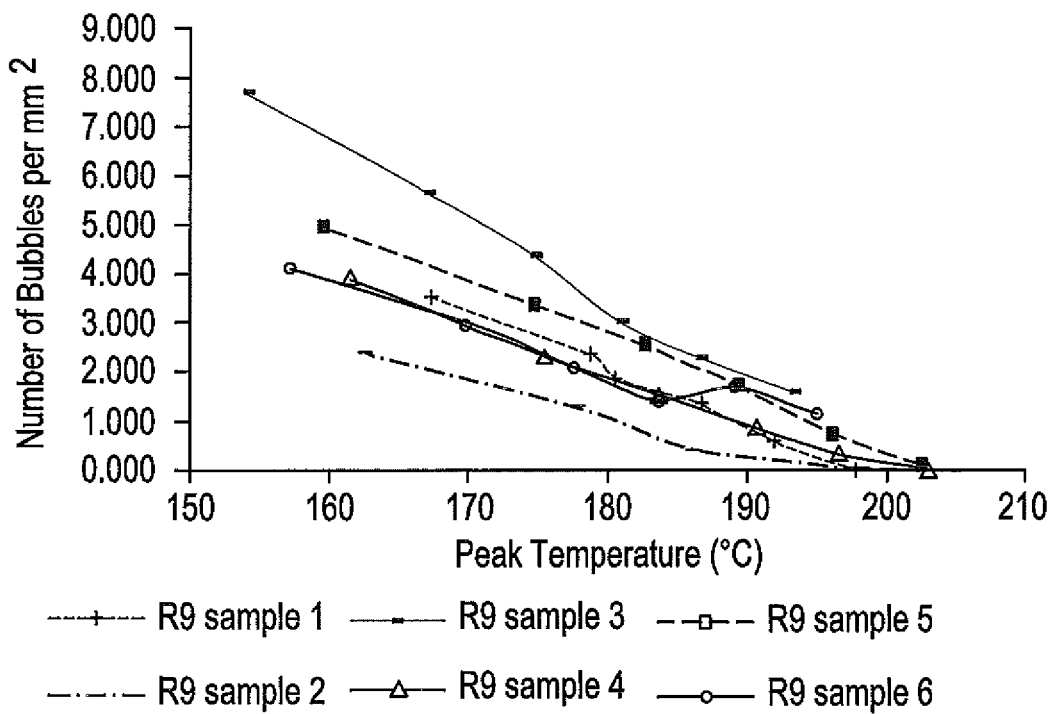
FIG. 10 represents the number of bubbles per $mm^2$ remaining in the molten resin as a function of temperature expressed in ° C.

The impact of the powders' granulometry on the processability was then studied for these same 6 samples, the most important factor being densification process resulting from bubble removal. The results are displayed in FIG. 10 representing the number of bubbles per mm$^2$ remaining in the molten resin as a function of temperature expressed in ° C. for all six samples. Quite surprisingly, the resins having the largest particle size displayed the highest rate of bubble removal as a function of increasing temperature.

Resins R1, R7, R9, R11 and R12 were tested for micropellets production. Three types of machines were used (Gala, BKG, Black Clawson) and the pelletisation conditions for each machine are summarised in Table VII.

TABLE VII

| Resin | Machine 1 | | | Machine 2 | | | Machine 3 | |
|---|---|---|---|---|---|---|---|---|
| | R9 | R1 | R12 | R9 | R1 | R11 | R9 | R7 |
| Micropellets | | | | | | | | |
| $<D_{eg}>$ (µm) | 700 | 600 | 650 | 525 | 525 | 470 | 600 | 550 |
| Throughput (kg/h) | 60 | 80 | 60 | 100 | 100 | 100 | 3 | 4 |
| Yield (%) | 65 | 95 | 95 | 95 | 95 | 95 | <50 | <50 |
| Residual water | no | no | No | yes | yes | yes | Yes | yes |
| Pelletisation | | | | | | | | |
| Extruder type | Twin screw: 60 mm | | | Twin screw: 75 mm | | | Twin screw: 50.8 mm | |
| Melt pump | yes | yes | Yes | yes | yes | yes | No | no |
| Number of holes | 300 | 300 | 300 | 2200 | 2200 | 2200 | 520 | 520 |
| Hole diameter (µm) | 400 | 400 | 400 | 300 | 300 | 300 | 350 | 350 |
| Hole length (mm) | 3 | 3 | 3 | — | — | — | 1.5 | 1.5 |
| Number of knives | 18 | 18 | 18 | 6 | 6 | 6 | 6 | 6 |
| Configuration | UW[1] | UW | UW | UW | UW | UW | WR[2] | WR |
| Conditions | | | | | | | | |
| Melt die T (° C.) | 228 | 236 | 242 | 240 | 249 | 240 | 250 | 250 |
| Pressure at die (bar) | 130 | 149 | 174 | 163 | 186 | 198 | 1100 | 1300 |
| Knives speed (rpm) | 3590 | 3595 | 3585 | 3600 | 3600 | 3600 | 3400 | 3400 |
| Water T (° C.) | 75 | 74 | 79 | 73 | 71 | 66 | 18 | 18 |
| Water rate (m$^3$/h) | 20 | 20 | 20 | 10 | 10 | 10 | — | — |
| Water pressure (bar) | — | — | — | — | — | — | 0.68 | 0.68 |
| Throughput/hole (kg/h) | 0.2 | 0.267 | 0.2 | 0.045 | 0.045 | 0.045 | 0.006 | 0.006 |
| Shear rate/hole (s−1) | 12000 | 15900 | 12000 | 6450 | 6450 | 6450 | 470 | 700 |
| Melt fracture | no | yes | Yes | no | yes | yes | No | yes |

UW[1]: under water
WR[2]: water ring

From Table VII it can be concluded that, on all types of machines, resin R9 was converted into micropellets at lower die pressure and at lower melt die temperature than the other resins tested, and steady state operations were established after 30 minutes. In addition R9 did not exhibit any melt fracture even at a very high shear rate of 12000 s−1.

Figure 11:
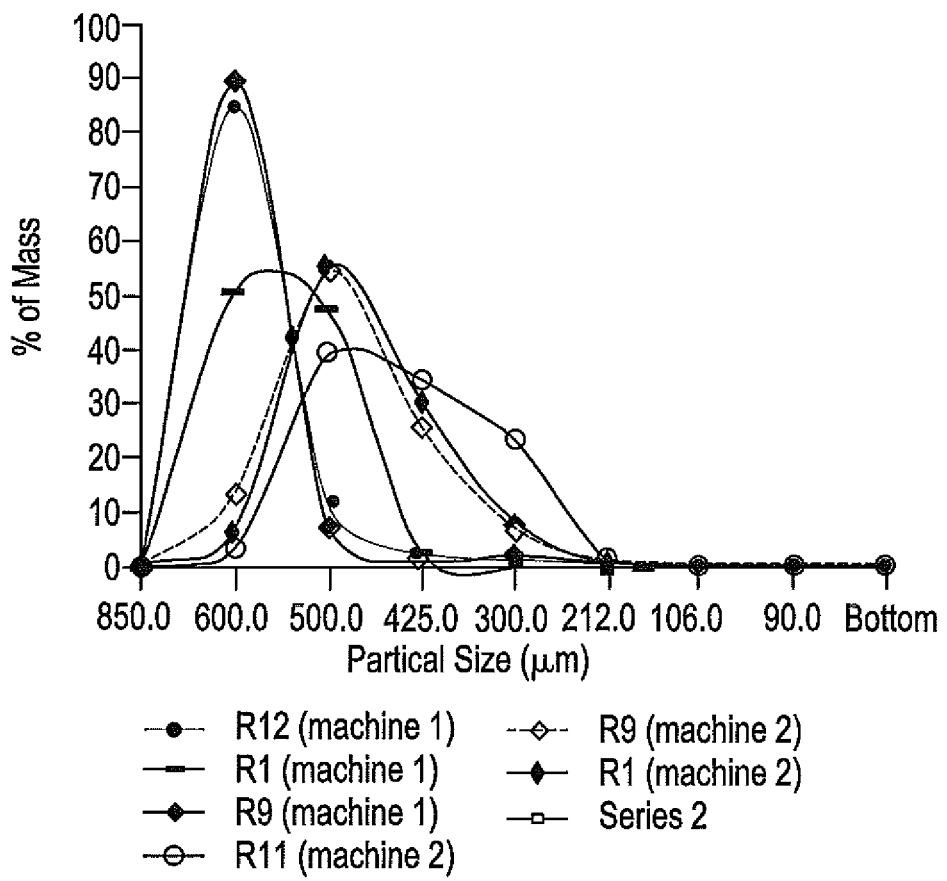
FIG. 11 represents the mass fraction of the micropellets expressed in percent as a function of particle size expressed in microns.
Figure 12:
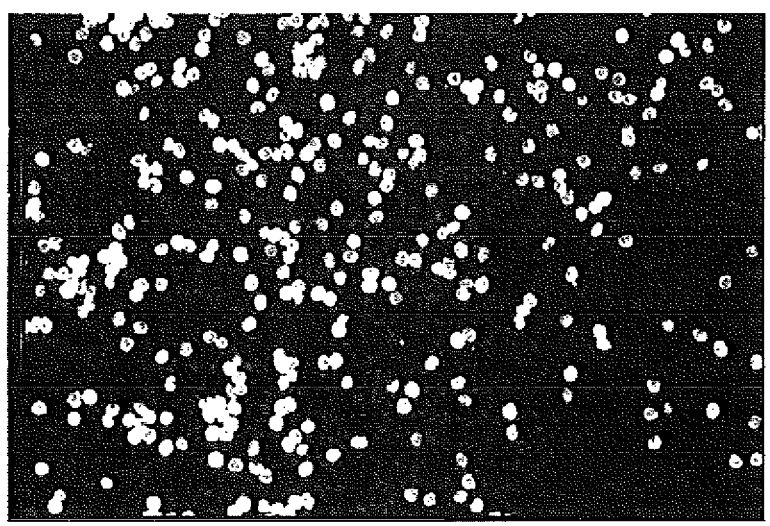
FIG. 12 represents a photograph of the micropellets produced on machine 2 for resin R9, under the conditions described in Table VII.

It must also be noticed that high viscosity resins R11 and R12 were easily converted into micropellets even though they had a very low melt index. The size distributions for several resins and machines are displayed in FIG. 11 representing the mass fraction of the micropellets expressed in percent as a function of particle size expressed in microns. The micropellets samples are displayed in FIG. 12 representing a photograph of the micropellets produced on machine 2 for resin R9, under the conditions described in Table VII.

Figure 13:
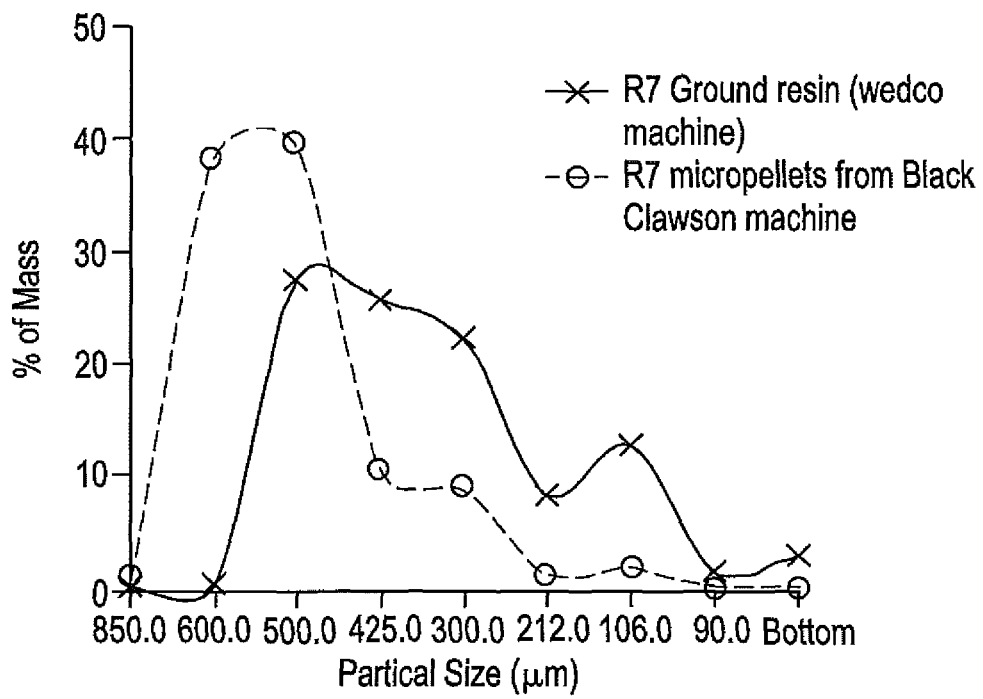
FIG. 13 represents the mass fraction of powders and micropellets expressed in percent as a function of particle size expressed in microns for resin R7.

A comparison of granulometry analysis for powders and micropellets is displayed in FIG. 13 representing the mass fraction of powders and micropellets expressed in percent as a function of particle size expressed in microns for resin R7 and showing clearly that the average size of the micropellets is substantially larger than that of powders.

Figure 14:
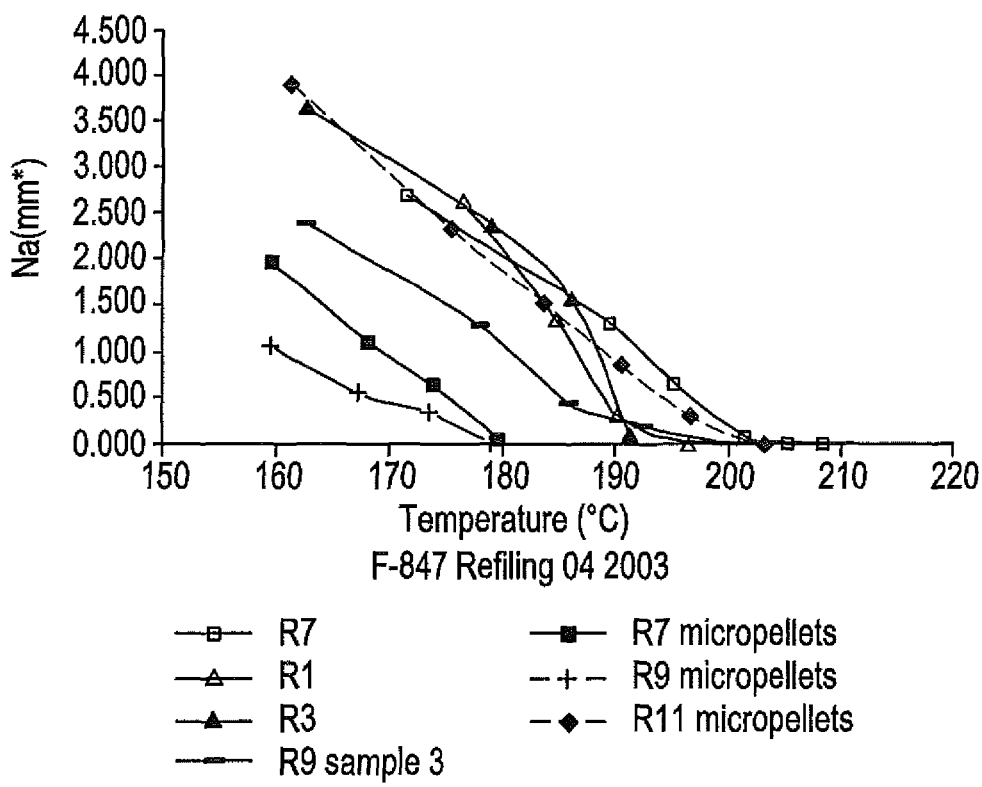
FIG. 14 represents the number of bubbles per $mm^2$ remaining in the molten resin as a function of temperature expressed in ° C. for several powder and micropellet samples of various granulometries.

The impact of the powders' and micropellets' granulometry on the processability was then studied for several samples, by way of the densification process resulting from bubble removal. The results are displayed in FIG. 14 representing the number of bubbles per mm$^2$ remaining in the molten resin as a function of temperature expressed in ° C. for several powder and micropellet samples of various granulometries.

It can be concluded from this figure that the micropellets exhibit a better bubble removal as a function of temperature than do the ground products.

In addition, the high viscosity resin R11 having a melt index MI2 of 0.9 g/10 min behaved remarkably well, and the limitation in rotational moulding to resins having a melt index larger than 2 g/10 min has thus been overcome.

Also, resins R11 and R12 have a high molecular weight and thus excellent mechanical properties: they are excellent candidates to replace the cross-linked polyethylene (XLPE) resins generally recommended in the field of rotational moulding.

The invention claimed is:

1. A rotationally molded hollow article having an inner foamed polyethylene layer and an outer polyethylene layer produced by rotational molding of a polyethylene resin, wherein the inner foamed polyethylene layer and outer polyethylene layer are comprised of a polyethylene resin produced by the polymerization of ethylene in the presence of a metallocene catalyst having a bis-cyclopentadienyl ligand structure or a bridged bis-indenyl ligand structure.

2. The article of claim 1 wherein said polyethylene resin is produced by polymerization of ethylene in the presence of a metallocene having a bridged tetrahydroindenyl ligand.

3. The article of claim 2 wherein said metallocene is ethylene bis(4,5,6,7-tetrahydro-1-indenyl) zirconium dichloride.

4. The article of claim 1 wherein said resin is produced by the polymerization of ethylene in the presence of a metallocene having a bis(n-butyl-cyclopentadienyl) ligand structure.

5. The article of claim 4 wherein said metallocene is bis(n-butyl-cyclopentadienyl) zirconium dichloride.

6. The article of claim 1 wherein said resin is an ethylene homopolymer.

7. The article of claim 1 wherein said resin is a copolymer of ethylene and a $C_3$-$C_{20}$ alpha olefin.

8. The article of claim 7 wherein said alpha olefin is selected from a group consisting of propylene, butene, hexene, octene and 4-methyl-pentene.

9. The article of claim 1 wherein said polyethylene resin has a density within the range of 0.925-0.945 g/cm$^3$ and a melt index within the range of 2.0-20.0 g/10 min.

* * * * *